G. A. F. MILDT.
BREAD BAKING PAN.
APPLICATION FILED MAY 3, 1912. RENEWED SEPT. 2, 1915.
1,168,819.
Patented Jan. 18, 1916.
2 SHEETS—SHEET 2.
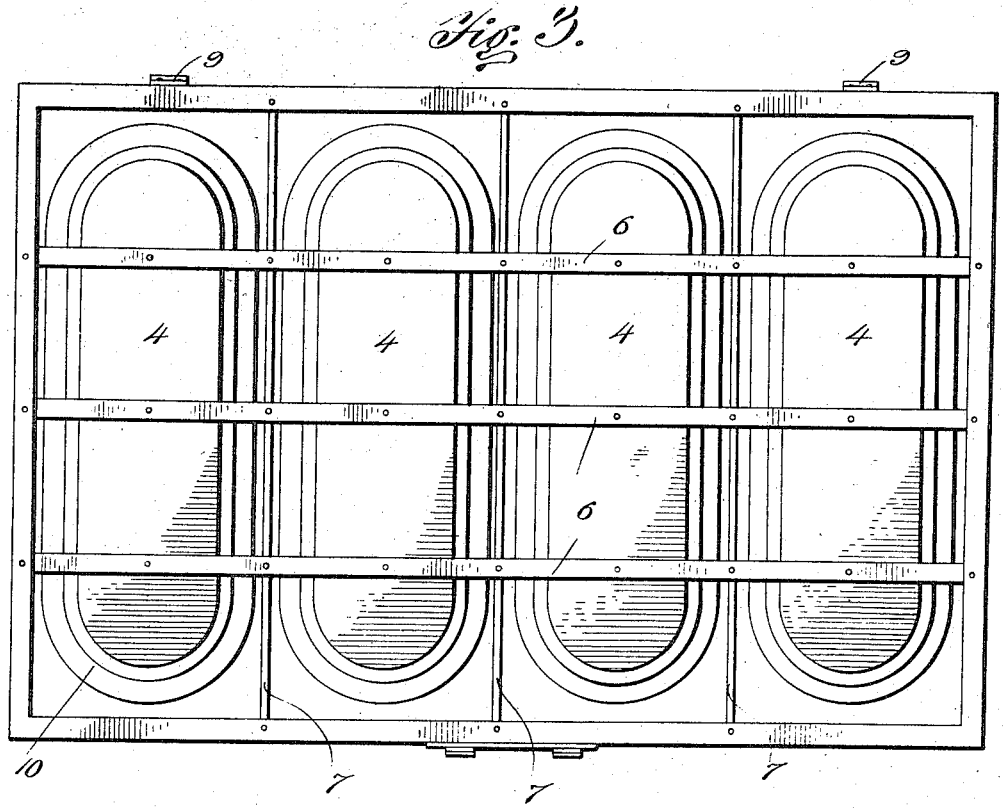
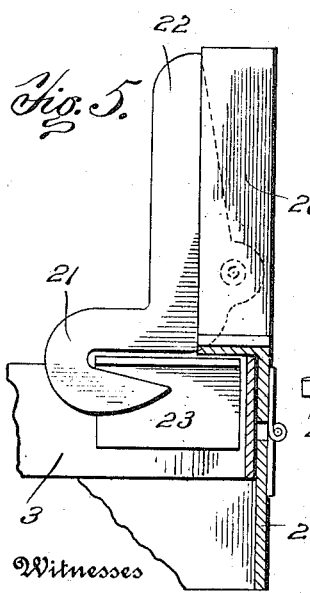
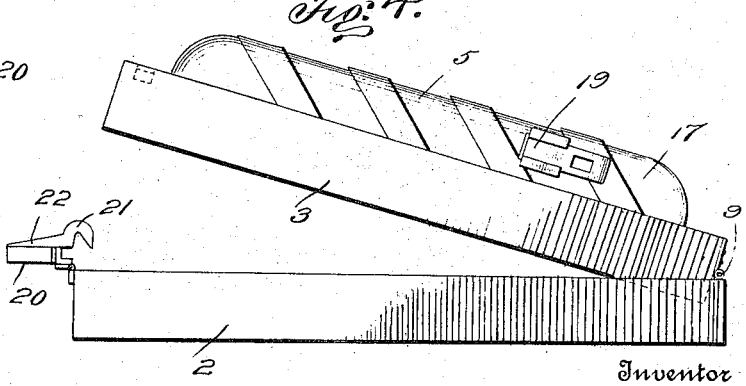
Witnesses
M. P. McKee
R. Kislink
Inventor
G. A. F. Mildt
By Alex J. Wedderburn, Jr.
Attorney

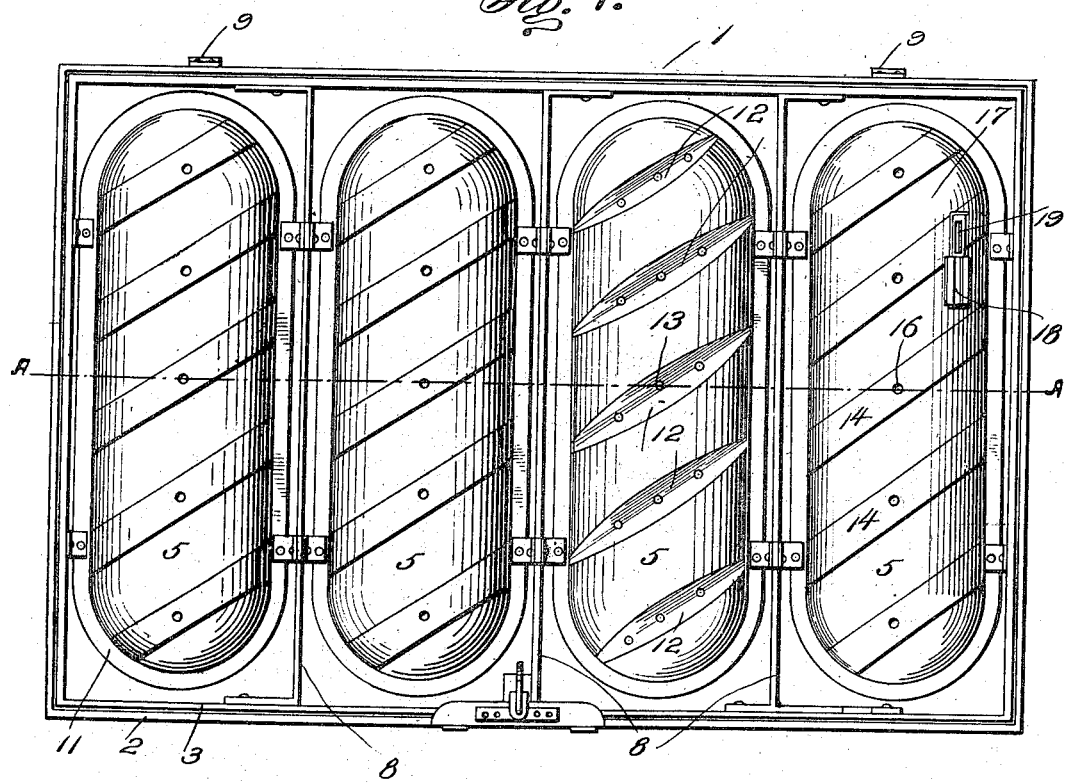
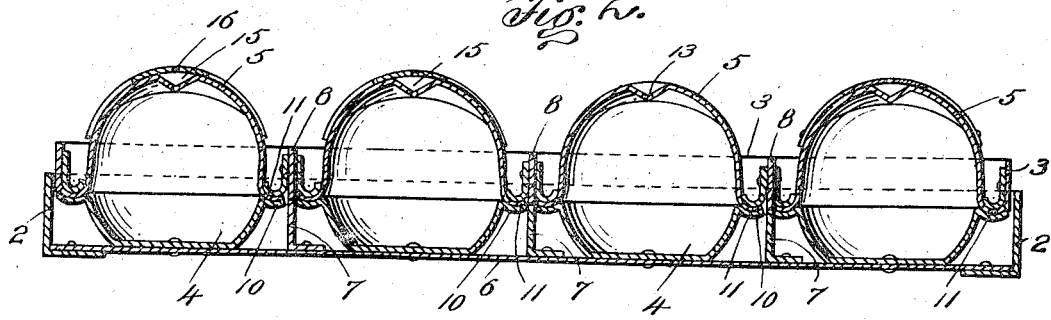

UNITED STATES PATENT OFFICE.

GUSTAV A. F. MILDT, OF CINCINNATI, OHIO.

BREAD-BAKING PAN.

1,168,819.     Specification of Letters Patent.     Patented Jan. 18, 1916.

Application filed May 3, 1912, Serial No. 694,969.    Renewed September 2, 1915. Serial No. 48,732.

*To all whom it may concern:*

Be it known that I, GUSTAV A. F. MILDT, a citizen of the United States, residing at Cincinnati, in the county of Hamilton and State of Ohio, have invented certain new and useful Improvements in Bread-Baking Pans, of which the following is a specification.

This invention relates to improvements in bread baking pans and has for its object to provide a baking pan so constructed that the crust of the bread will not form too quickly.

Another object of the invention is to provide a means in a baking pan whereby steam or vapor will be prevented from escaping too rapidly from the baking bread. And still another object of the invention is to provide a baking pan having means for collecting and pocketing steam in the cover thereof.

With the above and other objects in view I have invented the device illustrated in the accompanying drawings in which—

Figure 1 is a top plan view of my improved baking device, Fig. 2 is a sectional view taken on line A—A of Fig. 1, Fig. 3 is a bottom plan view, Fig. 4 is a side elevation of the device partially opened, Fig. 5 is an enlarged detail view of a catch mechanism.

Like reference characters indicate like parts both in the specification and drawings in which 1 indicates a baking device consisting of a pair of frames 2 and 3 carrying pan sections 4 and 5. The under frame 2 is provided with a series of cross bars 6 to which are secured the bottom pan sections 4, and this frame is also provided with a series of brace bars 7.

The frame 3 is provided with a series of bars 8 which serve the double function of stiffening the frame and assist in carrying the upper pan sections 5. The frames 2 and 3 are hinged together by the hinges 9. The frame 3 is slightly smaller than the frame 2 and nests therein as shown, when the device is closed. Each of the pan sections 4 and 5 is provided with horizontally disposed slightly curved flanges 10 and 11 whereby tight joints are provided between the opposing far sections 4 and 5.

The pan sections 5 which are the upper sections are provided with a series of indentures 12 in each of said sections. Each of these indentures is provided with a series of openings 13 and fixed covers 14 therefor forming pockets 15 in which steam arising from the baking dough in the pans and passing through the openings 13 is held, thereby preventing a crust from forming on top of the bread too quickly. A small opening 16 is provided in each cover 14 whereby any superabundance of steam may escape. In one of the upper sections 17 is an opening covered by a slide 19 having an opening 18 through which the bread may be looked at without opening the entire series of pans.

Hinged to the frame 2 is a latch carrying member 20 to which a latch 21 is pivoted. This latch is provided with a lever 22 whereby it may be operated to engage or disengage from the member 23 secured to the frame 3. The indentures 12 extend diagonally across said sections 5 and are V-shaped in cross section to form recesses in the bread.

Having now described my invention that which I desire to procure by Letters Patent is:

A device of the kind described comprising a base a plurality of separable pan sections mounted on said base, each of said upper pan sections being formed with a plurality of V-shaped elongated recesses extending across the body thereof, each recess having a plurality of perforations in the bottom thereof and provided with a strap covering said recess and extending down the sides of said upper sections, each of said straps provided with a small opening registering with the V-shaped recesses.

In testimony whereof I affix my signature in presence of two witnesses.

GUSTAV A. F. MILDT.

Witnesses:
    CHAS. VAN BOOR,
    ROBERT J. BUCHWALTER.